US008041324B2

(12) United States Patent
Noro et al.

(10) Patent No.: US 8,041,324 B2
(45) Date of Patent: Oct. 18, 2011

(54) ANTENNA APPARATUS

(75) Inventors: Junichi Noro, Akita (JP); Satoshi Kohno, Katagami (JP)

(73) Assignee: Mitsumi Electric Co., Ltd., Tama-shi, Tokyo (JP)

( * ) Notice: Subject to any disclaimer, the term of this patent is extended or adjusted under 35 U.S.C. 154(b) by 712 days.

(21) Appl. No.: 11/901,579

(22) Filed: Sep. 18, 2007

(65) Prior Publication Data

US 2008/0070513 A1 Mar. 20, 2008

(30) Foreign Application Priority Data

Sep. 20, 2006 (JP) ................................. 2006-254467

(51) Int. Cl.
*H04B 1/38* (2006.01)

(52) U.S. Cl. ................................ 455/269; 343/700 MS

(58) Field of Classification Search .................... 455/73, 455/80, 550.1, 562.1, 575.1, 269; 343/700 MS, 343/702, 846
See application file for complete search history.

(56) References Cited

U.S. PATENT DOCUMENTS 5,678,216 A * 10/1997 Matai ............................ 455/269
6,288,680 B1 * 9/2001 Tsuru et al. ................ 455/575.7
6,559,802 B2 * 5/2003 Goto et al. .................... 343/702
6,903,687 B1 * 6/2005 Fink et al. .............. 343/700 MS
7,620,421 B2 * 11/2009 Kato et al. ................. 455/562.1
7,683,837 B2 * 3/2010 Noro ...................... 343/700 MS
7,835,776 B2 * 11/2010 Boyle et al. ................ 455/575.7

FOREIGN PATENT DOCUMENTS

JP 9-102975 A 4/1997
JP 2003-264424 A 9/2003
JP 2004-048367 A 2/2004
JP 2004-282263 A 10/2004
JP 2005-203879 A 7/2005

OTHER PUBLICATIONS

Japanese Office Action dated Jan. 18, 2011 (and English translation thereof) in counterpart Japanese Application No. 2006-254467.
Japanese Office Action dated Jul. 19, 2011 (and English translation thereof) in counterpart Japanese Application No. 2006-254467.

* cited by examiner

*Primary Examiner* — Thanh C Le
(74) *Attorney, Agent, or Firm* — Holtz, Holtz, Goodman & Chick, PC

(57) ABSTRACT

An antenna apparatus, including: a power supply pin; a circuit substrate having a first through hole through which the power supply pin passes; and an antenna element having a second through hole which faces with the first through hole and through which the power supply pin passes, the antenna element being disposed at a distance from the circuit substrate; wherein the second through hole is formed smaller than a shaft diameter of the power supply pin and is widen by the power supply pin; and a periphery of the second through hole of the antenna element is curved to be convex toward the circuit substrate, and the power supply pin is fixedly nipped by a tip end of the periphery.

2 Claims, 1 Drawing Sheet

ANTENNA APPARATUS

BACKGROUND OF THE INVENTION

1. Field of the Invention

The present invention relates to an antenna apparatus, and more particularly, to an antenna apparatus used for receiving radio waves for GPS (Global Positioning System) or satellite radio.

2. Description of Related Art

With the development of mobile communication devices and small communication devices (e.g., car navigation systems and portable navigation systems with GPS, satellite wave receivers, and the like) of recent years, it is required to miniaturize the antenna apparatus used for these devices and to enhance performance thereof.

In this regard, among antenna apparatuses, a flat antenna apparatus (e.g., circular polarized patch antenna or the like) has a merit that the apparatus is thin and small due to its structure, and it is relatively easy to integrate with a semiconductor circuit and thus, the flat antenna apparatus is widely applied as an antenna for small communication devices.

As such a flat antenna apparatus, there is known an antenna apparatus having a dielectric substrate comprising high dielectric such as ceramic, a radiating element provided on a surface of the dielectric substrate, and a circuit substrate (for example Japanese Patent Application Laid-open No. 2003-264424).

Such an antenna apparatus is provided with a power supply pin such as to pass through the dielectric substrate, the circuit substrate and a reflective element. The power supply pin is soldered and fixed to the antenna apparatus.

In recent years, antenna apparatuses in which a ceramic dielectric substrate is omitted and an antenna element formed of a metal plate is disposed on a circuit substrate at a distance therefrom have been developed. In the case of such an antenna apparatus, if the power supply pin passes through the circuit substrate and the antenna element and the power supply pin is soldered to the circuit substrate and the antenna element, a passing portion of the circuit substrate and a passing portion of the antenna element are soldered. However, if an attempt is made to solder one of the passing portions after the soldering operation of the other passing portion is completed, heat of the latter soldering operation of the one passing portion is transmitted to the other passing portion through the power supply pin. Consequently, solder of the other passing portion which was already solidified is melted when the one of the passing portions is soldered, and the power supply pin could drop in some cases.

Further, if a crack is generated in the soldered portion between the antenna element and the power supply pin due to external force after the soldering operation, there is a possibility that flow of current is hindered and desired antenna performance can not be exhibited.

SUMMARY OF THE INVENTION

It is, therefore, a main object of the present invention to provide an antenna apparatus to enhance holding properties of a power supply pin without depending on a soldering state.

According to a first aspect of the present invention, there is provided an antenna apparatus, comprising:

a power supply pin;

a circuit substrate having a first through hole through which the power supply pin passes; and an antenna element having a second through hole which faces with the first through hole and through which the power supply pin passes, the antenna element being disposed at a distance from the circuit substrate; wherein the second through hole is formed smaller than a shaft diameter of the power supply pin and is widen by the power supply pin; and a periphery of the second through hole of the antenna element is curved to be convex toward the circuit substrate, and the power supply pin is fixedly nipped by a tip end of the periphery.

BRIEF DESCRIPTION OF THE DRAWINGS

The above and other objects, advantages, and features of the present invention will become more fully understood from the detailed description given hereinbelow and the appended drawings which are given by way of illustration only, and thus are not intended as a definition of the limits of the present invention, wherein.

DESCRIPTION OF THE PREFERRED EMBODIMENTS

An antenna apparatus of the embodiment will be explained with reference to the drawings.

Figure 1:
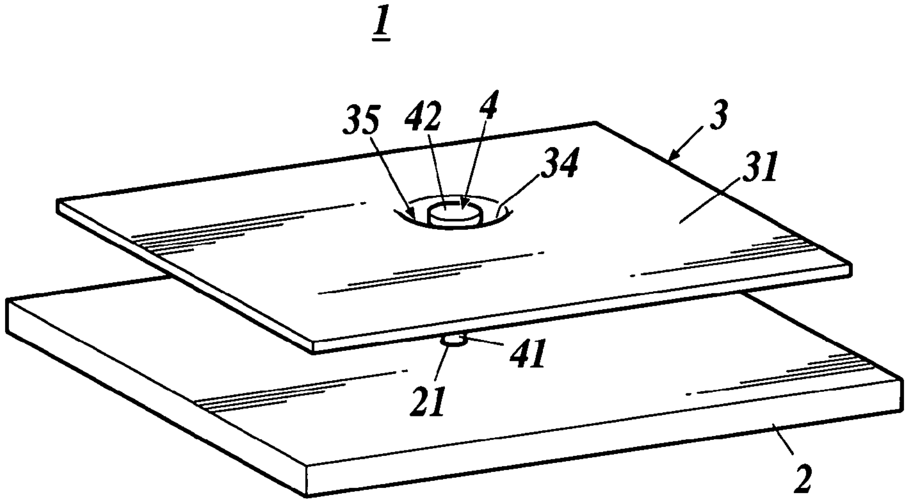
FIG. 1 is a schematic perspective view showing a structure of the antenna apparatus of the embodiment.
Figure 2:
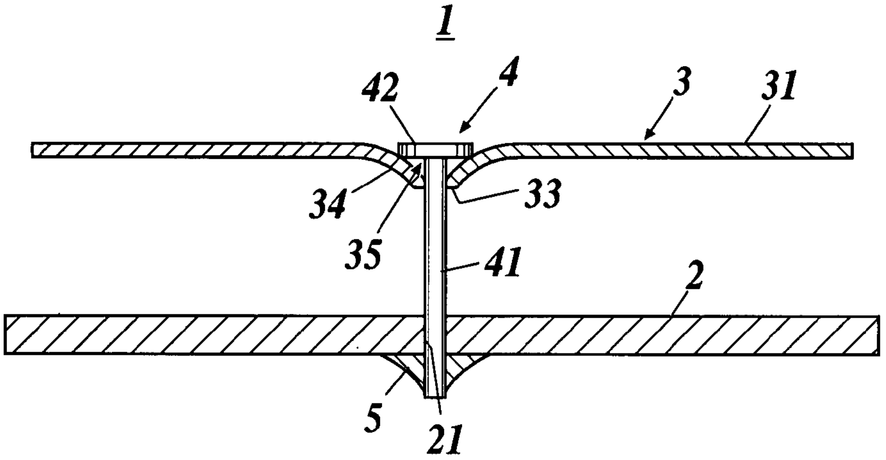
FIG. 2 is a sectional view of the antenna apparatus shown in FIG. 1.

FIG. 1 is a schematic perspective view showing a structure of the antenna apparatus, and FIG. 2 is a sectional view of the antenna apparatus. As shown in FIGS. 1 and 2, the antenna apparatus 1 includes a square circuit substrate 2, an antenna element 3 disposed at a distance from the circuit substrate 2, and a power supply pin 4 which passes through the circuit substrate 2 and the antenna element 3.

The circuit substrate 2 is formed with a first through hole 21 through which the power supply pin 4 passes. The first through hole 21 has an inner diameter which is equal to or greater than a shaft diameter of the power supply pin 4. A conductive layer (not shown) is formed on a back surface of the circuit substrate 2, and a circuit element such as a low noise amplifier (LNA) or the like is mounted on the conductive layer.

The antenna element 3 is provided with a square main body 31 disposed at a predetermined distance from the circuit substrate 2. A second through hole 33 is formed in the main body 31 at a location opposed to the first through hole 21 of the circuit substrate 2. The power supply pin 4 passes through the second through hole 33. The second through hole 33 is formed smaller than the shaft diameter of the power supply pin 4. As shown in FIG. 2, a periphery 34 of the second through hole 33 in the antenna element 3 is curved such as to be convex toward the circuit substrate 2, and a tip end of the periphery 34 fixedly nips the power supply pin 4.

The power supply pin 4 is provided with a shaft portion 41 and a large-diameter portion 42. The shaft portion 41 is longer than a distance between the circuit substrate 2 and the main body 31 of the antenna element 3. The large-diameter portion 42 has such a thickness and a diameter that the large-diameter portion 42 is accommodated in a recess 35 formed by curving of the periphery 34 of the second through hole 33 in the antenna element 3. A tip end of the shaft portion 41 of the power supply pin 4 which passes through the antenna element 3 and the circuit substrate 2 is fixed by solder 5.

An effect of the embodiment will be explained next.

When the antenna apparatus 1 is to be assembled, a worker mounts the antenna element 3 on the circuit substrate 2. Then, the worker inserts the power supply pin 4 into the second through hole 33 from the antenna element 3. At that time, since the periphery 34 of the second through hole 33 is curved so as to be convex toward the passing through direction of the power supply pin 4, even if the second through hole 33 is formed smaller than the shaft diameter of the power supply pin 4, the periphery 34 is deformed so that a curvature is reduced when the power supply pin 4 is inserted, and the power supply pin 4 passes through the second through hole 33. After the power supply pin 4 passes through the second through hole 33, the periphery 34 of the second through hole 33 in the antenna element 3 tries to elastically restore. With this, the tip end of the periphery 34 fixedly nips the power supply pin 4.

The worker further pushes the power supply pin 4 so that the shaft portion 41 passes through the first through hole 21 of the circuit substrate 2 and a tip end thereof projects from the circuit substrate 2. The worker solders the projecting portion and fixes the power supply pin 4 onto the circuit substrate 2. At the time of the soldering operation, the worker turns the antenna apparatus 1 over so that the soldering portion is turned upward, and then the soldering operation is executed. At that time, the large-diameter portion 42 of the power supply pin 4 is directed downward, but since the shaft portion 41 is fixedly nipped by the tip end of the periphery 34 of the second through hole 33 of the antenna element 3, the shaft portion 41 does not drop.

As described above, according to the embodiment, since the tip end of the periphery 34 of the second through hole 33 of the antenna element 3 fixedly nips the power supply pin 4, the holding properties can be enhanced by inserting the power supply pin 4 through the second through hole 33. Since the antenna element 3 and the power supply pin 4 are always in contact with each other by the fixedly nipping state, the conductive state can always be secured.

The present invention is not limited to the above-described embodiment and can appropriately be changed.

The tip end of the periphery 34 of the second through hole 33 of the antenna element 3 fixedly nips the entire periphery of the shaft portion 41 of the power supply pin 4 in the embodiment. Instead of this structure, the tip end of the periphery 34 of the second through hole 33 may be divided into at least three, and the divided tip ends may fixedly nip the power supply pin. With this, the contact area between the tip ends of the periphery 34 and the power supply pin 4 is reduced. Therefore, the power supply pin 4 can smoothly be inserted into the second through hole 33. The reason why the tip end is divided into three or more is that positional deviation when the power supply pin 4 is fixedly nipped can be suppressed.

The tip end of the periphery 34 of the second through hole 33 of the antenna element 3 fixedly nips the power supply pin 4 and the conductive state is secured in the embodiment. Alternatively, the antenna element 3 and the large-diameter portion 42 of the power supply pin 4 may be soldered to each other. With this, more reliable conductive state can be secured.

According to a first aspect of the preferred embodiments of the present invention there is provided an antenna apparatus, comprising:

a power supply pin;

a circuit substrate having a first through hole through which the power supply pin passes; and an antenna element having a second through hole which faces with the first through hole and through which the power supply pin passes, the antenna element being disposed at a distance from the circuit substrate; wherein the second through hole is formed smaller than a shaft diameter of the power supply pin and is widen by the power supply pin; and a periphery of the second through hole of the antenna element is curved to be convex toward the circuit substrate, and the power supply pin is fixedly nipped by a tip end of the periphery.

Preferably, in the antenna apparatus, the tip end of the periphery of the second through hole is divided into at least three, and the divided tip ends fixedly nip the power supply pin.

In the antenna apparatus, since the periphery of the second through hole is curved such as to be convex toward the passing through direction of the power supply pin, even if the second through hole is made smaller than the shaft diameter of the power supply pin, the periphery is deformed such that the curvature is reduced when the power supply pin is inserted, and the power supply pin passes through the second through hole. After the power supply pin passes through the second through hole, the periphery of the second through hole of the antenna element elastically tries to restore. With this, the tip end of the periphery fixedly nips the power supply pin. Thus, even if the power supply pin is not soldered, the holding properties can be enhanced only by inserting the power supply pin into the second through hole, and the conductive state can always be secured.

The entire disclosure of Japanese Patent Application No. 2006-254467 filed on Sep. 20, 2006 including description, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An antenna apparatus, comprising:

a power supply pin;

a circuit substrate having a first through hole through which the power supply pin passes; and an antenna element having a second through hole which faces the first through hole and through which the power supply pin passes, the antenna element being disposed at a distance from the circuit substrate;

wherein the second through hole is formed to be smaller than a shaft diameter of the power supply pin and is widened by the power supply pin; and wherein a periphery of the second through hole of the antenna element is curved to be convex toward the circuit substrate, and the power supply pin is fixedly nipped by a tip end of the periphery.

2. The antenna apparatus according to claim 1, wherein the tip end is divided into at least three portions, and the portions fixedly nip the power supply pin.

* * * * *